US006525646B1

(12) United States Patent
Bartz

(10) Patent No.: US 6,525,646 B1
(45) Date of Patent: Feb. 25, 2003

(54) IDENTIFICATION SYSTEM FOR THE USER OF A VEHICLE

(75) Inventor: Ruediger Bartz, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/321,216

(22) Filed: May 27, 1999

(30) Foreign Application Priority Data

May 27, 1998 (DE) ........................................ 198 23 708

(51) Int. Cl.[7] .......................... H04Q 1/00; G05B 19/00

(52) U.S. Cl. ..................... 340/5.72; 340/5.61; 340/5.41

(58) Field of Search .............................. 340/5.72, 5.25, 340/825, 415.5, 825.36, 5.41, 5.61; 705/65; 235/379

(56) References Cited

U.S. PATENT DOCUMENTS 5,221,838 A * 6/1993 Gutman et al. ............ 340/5.41
5,310,999 A * 5/1994 Claus et al. .................. 705/65
5,523,746 A 6/1996 Gallagher

FOREIGN PATENT DOCUMENTS

| | | |
|---|---|---|
| CH | 607669 | 10/1978 |
| DE | 4431028 | 3/1996 |
| DE | 4435894 | 4/1996 |
| FR | 2740500 | 4/1997 |
| JP | 08120992 | 5/1996 |
| WO | 97/09658 | 3/1997 |

OTHER PUBLICATIONS

Copy of Search Report.

* cited by examiner

*Primary Examiner*—Brian Zimmerman
(74) *Attorney, Agent, or Firm*—Crowell & Moring LLP

(57) ABSTRACT

In an identification system for the user of a vehicle having a mobile transponder which contains a memory for an authorization code and a transmitting-receiving device for transmitting the authorization code to a vehicle-fixed receiver, the transponder is arranged in a user's wristwatch.

17 Claims, 1 Drawing Sheet

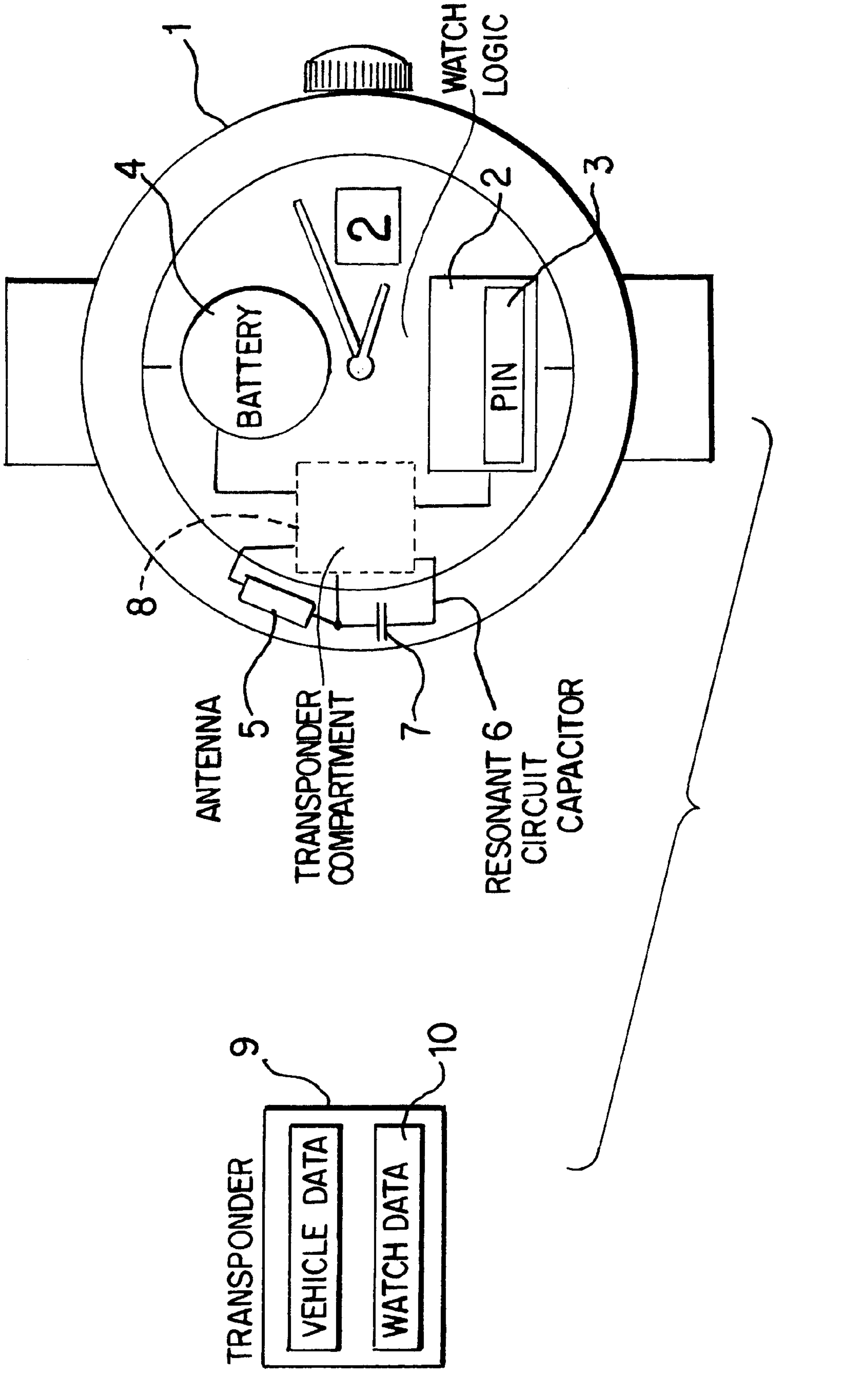
1
WATCH LOGIC
4
2
3
BATTERY
2
PIN
8
ANTENNA
5
TRANSPONDER COMPARTMENT
7
RESONANT 6 CIRCUIT CAPACITOR
9
10
TRANSPONDER
VEHICLE DATA
WATCH DATA

IDENTIFICATION SYSTEM FOR THE USER OF A VEHICLE

BACKGROUND AND SUMMARY OF THE INVENTION

This application claims the priority of German patent document 198 23 708.1, filed May 27, 1998, the disclosure of which is expressly incorporated by reference herein.

The invention relates to an identification system for the user of a vehicle, having a mobile transponder which contains a memory for an authorization code and a transmitting-receiving device for transmitting the authorization code to a vehicle-fixed receiver.

Identification systems of this generic type area generally known. The transponder is preferably connected with a mechanical key to form a modular unit. In addition stand-alone systems are known, such as disclosed for example in European Patent 452 346 B. Such systems are often called keyless entry or passive entry systems.

The known devices can be lost relatively easily and fall into the hands of an unauthorized user. This creates the considerable danger that the safety measures inherent in these devices are counteracted by minor carelessness.

It is an object of the invention to provide a system of the initially mentioned type which can be handled easily while its safety with respect to a loss is high.

This and other objects and advantages are achieved by the identification system according to the invention, in which the transponder is arranged in a user's wristwatch, and thus demands no additional attention. Since virtually everyone wears a wristwatch and is accustomed to it, a loss will be rapidly noticed and precautions can be taken so that the vehicle will not be used.

An advantageous embodiment of the invention includes a means for supplying such a system with energy. This embodiment not only has the advantage of low constructional expenditures but also the characteristic that, if it is removed from one wristwatch and inserted in another, it can erase the data content, provided it is situated in a volatile memory.

A further feature of the invention relates to the assignment of the transponder, the wristwatch and the vehicle. A problem occurs if the wristwatch with a transponder, which is fixed with respect to its data content, is used for access and driving authorization for the vehicle. The clearing and blocking of the watch only at the vehicle (that is, in connection with vehicle usage operations) represents a weak point with respect to protection against theft, because it would then be possible for an unauthorized user to read in the data content of his watch unnoticed by the authorized user and thereby procure access authorization for himself. The (authorized) user can also not be expected to hand over the wristwatch when he sells the vehicle.

Another embodiment of the invention provides a solution for this problem, in that the watch and the transponder can be separated from one another. When selling the vehicle, the user can thus keep the watch. This results, however, in the problem of synchronizing to another vehicle. This problem is basic and exists when the vehicle is first operated. It can be solved, however, as follows:

The user can buy a transponder, which is provided with a vehicle-individual authorization code, that is, it is, for example, programmed by means of vehicle data which can be obtained from the vehicle dealer under the same conditions under which he receives a replacement key (for example, by presenting his identification card and vehicle papers). He can buy the corresponding wristwatch at a store specializing in clocks and watches. It is important in this case that the watch is provided with an individual identification code, such as a factory designated PIN-number or, for example, a serial number. When the user now snaps the transponder into the watch (for example, into a container in the battery compartment) by means of a contact, the transponder is supplied with energy from the energy accumulator of the watch. Then the identification code is automatically read out of the logic part of the watch, and is filed in the transponder in a volatile memory (RAM).

This watch can then be assigned to the vehicle. For example, by means of a mechanical vehicle key, the vehicle is opened up and started and subsequently a transponder query is started. The transponder will then transmit the identification code in addition to its authorization code, both of which are stored in the vehicle. When, at the time of another access, the two codes are transmitted, the vehicle recognizes the user as being the authorized user. The described identification of the user is secure with respect to unauthorized manipulations because the storage of the identification code will take place only if, together with it, the vehicle-individual authorization code is also transmitted.

Although the content of the volatile memory will be lost when the energy accumulator of the wristwatch is changed, access to the vehicle is possible in the above-described manner without hindrance. When the energy accumulator of the watch is activated, the identification code is read into the RAM of the transponder. Upon a query by the vehicle, this identification code is read out of the transponder, together with the authorization code, and is recognized in the vehicle by means of the identification code, known from the earlier synchronizing operation, which continues to be held there.

When the vehicle is sold, the transponder is transferred to the new owner, who can insert it into his wristwatch having an individual identification code. By means of the mechanical key, the new user proves his access authorization. Since previously, when the transponder was inserted, the identification code was read into the RAM of the transponder, during the query by the vehicle, this identification code, together with the unchanged and still valid authorization code, can be read out of the transponder and stored in the vehicle.

According to another feature of the invention, the time indicated on the wristwatch can also be transmitted by the transmitting-receiving device, and can be fed into a synchronizing device of the vehicle clock.

Other objects, advantages and novel features of the present invention will become apparent from the following detailed description of the invention when considered in conjunction with the accompanying drawings.

BRIEF DESCRIPTION OF THE DRAWINGS

The single FIGURE schematically illustrates the construction of a wristwatch, by means of which the vehicle can be accessed and/or its operation can be started.

DETAILED DESCRIPTION OF THE DRAWINGS

Referring to the FIGURE, a wristwatch 1 contains a logic part 2 with a fixed memory 3 in which an identification code (PIN) is stored. The wristwatch also has an energy accumulator 4, an antenna 5 and a pertaining resonant circuit 6 which includes a capacitor 7. A transponder 9 with a volatile memory (RAM) 10 can be inserted into a receiving device 8, which transponder 9 also contains in a constantly stored manner a vehicle-individual authorization code.

Provided that an operable energy accumulator 4 exists when the transponder 9 is inserted in the receiving device 8, the PIN is entered into the logic part 2 and is stored in the RAM 10 in a volatile memory. Upon a query of the vehicle, received by means of the antenna 5 and transmitted to the transponder 9, the latter reads out the identification code as well as the authorization code and transmits them by way of the resonant circuit 6 and the antenna 5 to the vehicle. If both codes are identical with the corresponding codes held there, the vehicle recognizes the wristwatch or the transponder of the authorized user and unlocks the vehicle and/or prepares the start of the operation of the driving engine.

When the energy accumulator 4 is changed and/or the transponder 9 is removed from the receiving device 8, or when the transponder 9 is inserted again in the receiving device 8, the PIN in the RAM of the logic part 2 is first erased and, if the transponder 9 is inserted and the energy accumulator 4 is operative (again), the PIN is read out of the logic part 2 and stored again in the RAM 10 of the transponder 9. When transmitted again, the then present authorization code, together with the unchangeable identification code of the wristwatch 5, is emitted by way of the antenna 5.

As the result of the joint transmission of the authorization code and the identification code, it is then possible to remove the transponder 9 from the wristwatch 1 and to insert it into another wristwatch. At this wristwatch, the different identification code (which will then exist there) is transmitted, together with the vehicle-individual authorization code of the transponder 9 to the vehicle and, if the two codes are held there, the user is recognized as being authorized.

The user receives the authorization in that, in a learning mode, the identification code of the wristwatch is transmitted together with the authorization code already stored in the vehicle. The learning mode is set, for example, in that a mechanical vehicle key is used and the vehicle is mechanically opened up or an ignition starter switch is mechanically closed.

This learning mode is required each time the transponder (together with the vehicle individual authorization code) is inserted into a new wristwatch (with a new identification code). If, in contrast, only the energy accumulator is exchanged, as the result of the new supply of the transponder 9 and thus of its volatile memory 10 from the energy accumulator 4, the PIN is read out of the logic part 2 and is stored in the RAM 10 of the transponder 9. During the transmission, the authorization and identification code already known to the vehicle are again transmitted to the vehicle. A battery exchange therefore has no effect on the operability of the illustrated wristwatch 1.

In this manner, it is possible to provide a wristwatch 1 with the functionality of a transponder, which carrying out the opening and start the operation of the vehicle without need of a separate transponder for this purpose.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Identification system for the user of a vehicle, comprising:
- a mobile transponder;
- a memory in said transponder, for storing an authorization code; and
- a transmitting-receiving device in said transponder, for transmitting the authorization code to a vehicle-fixed receiver; wherein
  - the transponder is removably arranged in a user's wristwatch which has a user identification code stored therein;
  - the transmitting-receiving device transmits the identification code together with the authorization code; and
  - the vehicle recognizes authorization of said user to operate the vehicle only when both the authorization code and the identification code match information stored in the vehicle.

2. Identification system according to claim 1, wherein the transponder is supplied with electrical energy from an electric energy accumulator of the wristwatch.

3. Identification system according to claim 2, wherein the transponder includes a volatile memory for receiving the identification code of the wristwatch.

4. Identification system according to claim 3, wherein the identification code can be read into a vehicle fixed memory.

5. Identification system according to claim 2, wherein the identification code can be read into a vehicle fixed memory.

6. Identification system according to claim 1, wherein the identification code can be read into a vehicle fixed memory.

7. Identification system according to claim 6, wherein a block is provided for the reading-in which can be overcome only by the authorized user.

8. Identification system according to claim 7, wherein time indicated on the wristwatch can also be transmitted by the transmitting-receiving device, and can be fed into a synchronizing device of the vehicle clock.

9. Identification system according to claim 6, wherein time indicated on the wristwatch can also be transmitted by the transmitting-receiving device, and can be fed into a synchronizing device of the vehicle clock.

10. Identification system according to claim 1, wherein time indicated on the wristwatch can also be transmitted by the transmitting-receiving device, and can be fed into a synchronizing device of the vehicle clock.

11. A method for protecting against unauthorized use of a vehicle, comprising:
- providing an authorization code stored in a transponder module;
- providing a personal identification code in a component which is transportable by a vehicle operator, said component having a receptacle for receiving said transponder;
- removably inserting said transponder module into said receptacle in said component, whereby said personal identification code is readable by said transponder;
- said transponder transmitting said authorization code and said personal identification code to a vehicle;
- said vehicle recognizing an authorization of said vehicle operator only if both of said authorization code and said personal identification code match information previously stored in said vehicle.

12. The method according to claim 11, wherein:
- said authorization code is permanently stored in said vehicle;

said personal identification code can be stored in said vehicle during a learning mode.

13. The method according to claim 12, wherein said learning mode is activated by manipulation of a vehicle key in said vehicle.

14. The method according to claim 11, wherein said step of said vehicle recognizing an authorization comprises at least one of unlocking the vehicle and enabling starting of a vehicle engine.

15. Apparatus for protecting against unauthorized use of a vehicle, comprising:

a transponder module having an authorization code stored therein;

a portable component which is transportable by an authorized vehicle operator, said portable component having a personal identification number stored in a memory therein, and having a receptacle for receiving said transponder, such that said personal identification code is readable by said transponder; and a transmitter device contained in said transponder, for transmitting to a vehicle said authorization code and said personal identification code read by said transponder from said portable component;

wherein one of unlocking and starting said vehicle is enabled only when both of said authorization code and said personal identification code match information previously stored in said vehicle.

16. The apparatus according to claim 15, wherein:

said authorization code is permanently stored in said vehicle;

said personal identification code can be stored in said vehicle during a learning mode.

17. The apparatus according to claim 16, wherein said learning mode is activated by manipulation of a vehicle key in said vehicle.

* * * * *